C. ROBERTS.
Wheel Cultivator.
No 45,860. Patented Jan. 10, 1865.
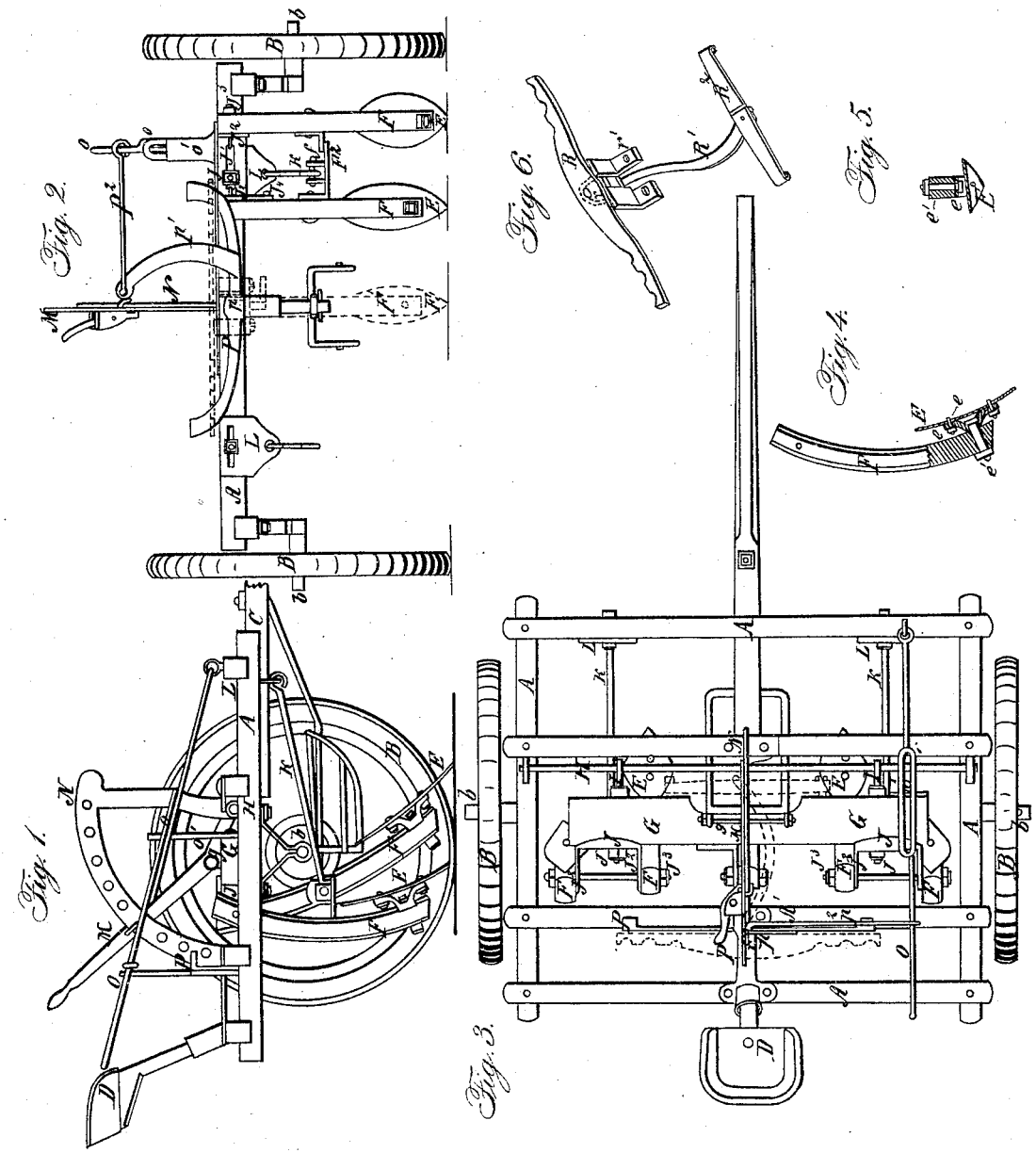
Witnesses:
Inventor:

# UNITED STATES PATENT OFFICE.

CYRUS ROBERTS, OF THREE RIVERS, MICHIGAN.

IMPROVEMENT IN CULTIVATORS.

Specification forming part of Letters Patent No. 45,860, dated January 10, 1865.

*To all whom it may concern:*

Be it known that I, CYRUS ROBERTS, of Three Rivers, in the county of St. Joseph and State of Michigan, have invented a certain new and useful Improvement in Cultivators, of which the following is a full, clear, and exact description, reference being had to the accompanying drawings, which make part of this specification, and in which—

Figure 1 represents a view in elevation of one side of my improved cultivator with the rear wheel removed. Fig. 2 represents a similar view of the same, as seen from the rear, with a portion of the frame and mechanism removed, as indicated by the red dotted line of Fig. 3. Fig. 3 represents a plan or top view of the entire machine, the red lines showing a modified form of foot-lever for vibrating the plow-frame. Fig. 4 represents a view, partly in section, of one of the shovel-stocks detached from the frame. Fig. 5 represents a section through the same at the line $xx$ of Fig. 4, and Fig. 6 represents a view in perspective of the modified form of shifting-lever shown in red lines in Figs. 2 and 3.

The improvement herein claimed consists, first, in combining the main frame, the shifting plow-frame, the lifting-lever, the shifting mechanism, and the driver's seat in the manner hereinafter described, so that the driver, when in his seat, can simultaneously raise or lower the plows and shift them laterally without releasing his grasp upon the reins; secondly, in combining a foot-lever with the shifting frame, as hereinafter described, to enable the driver to shift the plows in the manner of a tiller; thirdly, in so combining the main frame, shifting frame, plows, and corn-guard that they shall all vibrate on a common center within the plane of the wheels, as hereinafter described.

In the accompanying drawings, which represent a convenient arrangement of parts for carrying out the objects of my invention, a stout rectangular main frame, A, is shown as supported by two wheels, B, mounted on independent short shafts or axles $b$, secured to brackets projecting beneath the frame. A tongue, C, is rigidly secured to and projects from the front of this frame, while a seat, D, for the driver or attendant is secured in a corresponding position on its rear, so that the weight of the driver when in his seat counterbalances the tongue. Shovels or plows E are secured upon stocks or standards F, attached to a frame or bar, G, arranged centrally within the main frame and in the same horizontal plane with it, the front end of which is pivoted to a rod or bar, H, attached to the main frame, by means of two eyes or loops, I, which traverse freely upon it. By this mode of construction the frame and plows are free to play both in a vertical and a horizontal direction, when desired.

It will be observed that the plows are all pivoted in a common center, H, and are also all arranged so as to fall within the plane of the wheels and in, or very nearly in, the line of the axles $b$, the shifting frame being also within the plane of the wheels, but above their axles, which method of construction enables me to cultivate tall plants and over uneven ground with facility and to manipulate the machine with rapidity and ease.

The vertical movements of the shifting frame G are controlled by a hand-lever, M, pivoted at its lower end to the main frame and at an intermediate point to a bar, $g$, on the shifting-frame, which bar slides endwise through an opening in the lever in order not to impede its lateral movement. This lever terminates within convenient reach of the driver's seat, and is adjusted and held in any desired position by means of a detent, N.

The lateral movements of the plow may be controlled by a hand-lever, O, pivoted to the main frame and extending backward beyond its rear, a loop, $o$, on the lever embracing a stud or standard, $o'$, on the sliding frame G. This device is very convenient to enable an attendant to shift the plows while walking behind the machine.

To enable the driver to shift the plows with either his hands or his feet, or both, when riding on the machine, a curved rocking lever, P, may be mounted on the main frame, so as to vibrate freely in a vertical plane on a pivot, $p$, in front of the driver's seat. A curved arm, $p'$, and link $p^2$ connect this lever with the hand-lever O, and it is obvious that by pressing alternately with his feet on either end of the rocking lever the driver can shift the plows as desired.

The shifting-lever above described is a convenient one for use with either the hands or feet, or both. For use with the feet alone, however, I have invented a more simple and compact arrangement, and one which I prefer. This device (shown in perspective in Fig. 6, and in red lines in Figs. 2 and 3) consists of a foot-lever, R, pivoted at r in a bracket, r', bolted to the under side of the cross-bar A' in front of the driver's seat. A rod, R', firmly secured to the lever extends forward to the front part of the sliding frame G, (being curved, as shown in the drawings, to avoid the central stock, F',) where it terminates in two cross-arms, R², hinged so as to play horizontally on their pivots in order to accommodate themselves to the lateral movements of the shifting frame, to which their extremities are connected by yielding joints in order to permit of the proper vertical movements of the shifting frame. The driver presses with his feet alternately on the ends of the lever R, which acts as a tiller, and thus shifts the plows from side to side as required to conform to the irregularities of the rows. When this lever is employed the one previously described is of course removed, together with its attendant mechanism.

In working young crops I sometimes employ a shield or corn-guard, S, to protect the plants. This guard consists of a skeleton cage, frame, or grating of small rods, bars, or wires, shaped somewhat like a sled, being connected by a tongue or stay-rod, s, to the main frame or tongue in such manner as to allow it to play freely both vertically and laterally in conformity with the movements of the shifting frame G, to which it is connected by a loop or eye-bolt, s', which encircles the center stock, F', the center shovels being always removed when the guard is used. The loop slides freely on the center stock, and can be adjusted to any desired height thereon by means of a series of holes in the stock and a stop-pin, or in any other well-known way.

The guard, it will be observed, lies within the plane of the wheels in the line of the shovels and partakes of all the movements of the shifting-frame, so that, while free to vary its position relatively to the main frame, it always maintains its proper relations to the plows, the advantages of which arrangement will be obvious to all practically familiar with the subject.

It is deemed unnecessary here to describe in detail the construction of the other parts of the machine, as such details are fully described in another application for Letters Patent by me filed simultaneously with this, and marked B.

What I claim herein as new, and desire to secure by Letters Patent of the United States, is—

1. The combination of the main frame, the shifting plow-frame, the lifting-lever, and the shifting mechanism O P, with the driver's seat, when arranged for joint operation, as described.

2. The shifting foot-lever R, constructed and arranged to operate as and for the purposes described.

3. The combination of the shifting frame, the plows, and the corn-guard, with the main frame, when constructed and arranged to operate as described, for the purposes set forth.

In testimony whereof I have hereunto subscribed my name.

CYRUS ROBERTS.

Witnesses:
S. CHADWICK,
S. L. HERRICK.